United States Patent
Tanimoto et al.

(10) Patent No.: US 6,451,898 B1
(45) Date of Patent: Sep. 17, 2002

(54) AQUEOUS EMULSION AND METHOD FOR PRODUCING IT

(75) Inventors: Seiji Tanimoto; Naokiyo Inomata, both of Kurashiki (JP)

(73) Assignee: Kuraray Co., Ltd., Kurashiki (JP)

(*) Notice: Subject to any disclaimer, the term of this patent is extended or adjusted under 35 U.S.C. 154(b) by 15 days.

(21) Appl. No.: 09/666,467

(22) Filed: Sep. 20, 2000

(30) Foreign Application Priority Data

Oct. 1, 1999 (JP) ............................................ 11-281463

(51) Int. Cl.⁷ ............................... C08F 2/22; C08F 2/23
(52) U.S. Cl. ........................ 524/459; 524/503; 526/202
(58) Field of Search ............................ 524/503, 459; 526/202

(56) References Cited

U.S. PATENT DOCUMENTS 5,308,910 A * 5/1994 Yuki et al. .................. 524/503
5,331,055 A * 7/1994 Fujiwara et al. ............. 525/244
6,221,952 B1 * 4/2001 Nakamae ..................... 524/503

* cited by examiner

*Primary Examiner*—Judy M. Reddick
(74) *Attorney, Agent, or Firm*—Oblon, Spivak, McClelland, Maier & Neustadt, P.C.

(57) ABSTRACT

Provided is an aqueous emulsion comprising, as the dispersant, a polyvinyl alcohol containing from 1 to 15 mol % of ethylene units in the molecule and having a degree of hydrolysis of at least 95 mol %; and, as the dispersoid, a vinyl ester polymer. The aqueous emulsion is characterized in that, when its film is immersed in water at 20° C. for 24 hours, the degree of water solubility of the film is at most 1.5%, and the degree of water absorption of the film is at most 30%, and that the ratio of the emulsion viscosity at 60° C. ($T_{60°\ C.}$) to the emulsion viscosity at 20° C. ($T_{20°\ C.}$) $T_{60°\ C.}/T_{20°\ C.}$ is at most 2. The aqueous emulsion has good high-temperature viscosity stability (that is, this depends little on ambient temperatures and has good high-temperature storage stability), and has improved water resistance and improved low-temperature storage stability.

19 Claims, No Drawings

AQUEOUS EMULSION AND METHOD FOR PRODUCING IT

BACKGROUND OF THE INVENTION

1. Field of the Invention

The present invention relates to an aqueous emulsion having the advantages of good water resistance, high-temperature viscosity stability and low-temperature storage stability, and to a method for producing such an aqueous emulsion having the advantage of good polymerization stability.

2. Description of the Related Art

Heretofore, polyvinyl alcohol (hereinafter referred to as PVA) is widely used as protective colloid in emulsion polymerization of an ethylenic unsaturated monomer, especially a vinyl ester monomer such as typically vinyl acetate. Aqueous emulsions of vinyl ester polymers obtained through emulsion polymerization with PVA serving as protective colloid have many applications in various fields of adhesives for paper products, wood products, plastics, etc., binders for dip-coated paper, non-woven fabrics, etc., as well as admixtures, jointing agents, coating compositions, paper processing agents, fiber processing agents, etc.

Controlling the degree of hydrolysis of PVA therein makes it possible to change the physical properties of such aqueous emulsions, some of which will have low viscosity just like Newtonian fluid, and will be relatively highly resistant to water, while some others will have high viscosity relatively independently of ambient temperatures. Depending on such their properties, aqueous emulsions containing PVA have many applications in various fields.

However, some aqueous emulsions containing PVA have drawbacks in that their fluidity (high-speed coatability) is poor, that their water resistance is poor, that their viscosity greatly varies depending on ambient temperatures, and that their viscosity significantly increases at low temperatures. It is known that the properties of aqueous emulsions containing PVA greatly depend on PVA therein used for emulsion polymerization.

PVA serving as a dispersant for emulsion polymerization is generally grouped into "completely hydrolyzed PVA" having a degree of hydrolysis of 98 mol % or so and "partially hydrolyzed PVA" having a degree of hydrolysis of 88 mol % or so. Aqueous emulsions containing the former PVA could have relatively good water resistance and fluidity (high-speed coatability), but are problematic in that their viscosity greatly increases and therefore they soon gel when left at low temperatures. On the other hand, aqueous emulsions containing the later PVA could have improved properties in some degree in that their viscosity increase at low temperatures is retarded and they are not so much gelled even at low temperatures. However, they are still problematic in that their water resistance is poor. To solve the problems with these aqueous emulsions containing PVA, using the two types of PVA as combined in aqueous emulsions, or using PVA having an intermediate degree of hydrolysis therein is tried. However, no one has heretofore succeeded in realizing aqueous, PVA-containing emulsions that satisfy the two requirements of good water resistance and good low-temperature storage stability for their viscosity. In that situation, PVA with ethylene units therein has been proposed for use in aqueous emulsions (see Japanese Patent Laid-Open Nos. 81666/1996, 80709/1994, 226774/1998, etc.). Containing it, aqueous emulsions have much improved water resistance and low-temperature storage stability. However, their high-temperature viscosity stability is not still good. In other words, their viscosity still varies, depending on ambient temperatures, and, in addition, their high-temperature storage stability is not also good.

SUMMARY OF THE INVENTION

The present invention is to solve the problems with the related art techniques, and its object is to provide an aqueous emulsion having the advantages of far improved high-temperature viscosity stability (that is, the emulsion is anywhere stable independently of ambient temperatures, and its high-temperature storage stability is good) and far improved water resistance and low-temperature storage stability, and also to provide a method for producing such an aqueous emulsion having the advantage of good polymerization stability.

Specifically, the invention provides an aqueous emulsion which comprises, as the dispersant, a polyvinyl alcohol containing from 1 to 15 mol % of ethylene units in the molecule and having a degree of hydrolysis of at least 95 mol %, and, as the dispersoid, a vinyl ester polymer, and which is characterized in that, when its film is immersed in water at 20° C. for 24 hours, the degree of water solubility of the film is at most 1.5%, and the degree of water absorption of the film is at most 30%, and that the ratio of the emulsion viscosity at 60° C. ($T_{60°\ C.}$) to the emulsion viscosity at 20° C. ($T_{20°\ C.}$), $T_{60°\ C.}/T_{20°\ C.}$ is at most 2.

In this, the degree of emulsion release and the degree of water absorption are measured according to the methods mentioned hereinunder. Films having a degree of water solubility of them of at most 1.5% and having a degree of water absorption of at most 30% are meant to have good water resistance. Preferably, the degree of water solubility of the film obtained from the emulsion of the invention is at most 1.1%; and the degree of water absorption of the film is at most 27%.

The ratio of the emulsion viscosity at 60° C. ($T_{60°\ C.}$) to the emulsion viscosity at 20° C. ($T_{20°\ C.}$), $T_{60°\ C.}/T_{20°\ C.}$ is measured according to the method mentioned hereinunder. In general, ordinary vinyl ester polymer emulsions containing, as the dispersant, an ethylene-containing PVA have high viscosity at around 60° C. However, the aqueous emulsion of the invention is so defined that its viscosity change ratio $T_{60°\ C.}/T_{20°\ C.}$ is at most 2. This means that the viscosity increase in the aqueous emulsion of the invention is retarded at around 60° C., or that is, the temperature dependence of the aqueous emulsion of the invention is small. As its viscosity increase at around 60° C. is thus retarded, the aqueous emulsion of the invention shall have the advantages of viscosity increase retardation anytime during polymerization to give the emulsion, and even during high-temperature storage, transportation and use of the emulsion. Accordingly, the workability and the handlability of the emulsion of the invention are much improved.

More preferably, the ratio of the emulsion viscosity after stored at 60° C. for 1 week ($H_{60°\ C.}$) to that after stored at 20° C. for 1 week ($H_{20°\ C.}$), $H_{60°\ C.}/H_{20°\ C.}$, is at most 2.5. The viscosity change ratio $H_{60°\ C.}/H_{20°\ C.}$ of the emulsion is measured according to the method mentioned hereinunder. The emulsion having a viscosity change ratio, $H_{60°\ C.}/H_{20°\ C.}$ of at most 2.5 is meant to have good high-temperature storage stability. Concretely, the viscosity of the emulsion having such a limited viscosity change ratio does not increase so much even when it is stored at high temperatures of around 60° C. for 1 week or so, and the emulsion can be well worked and handled anytime at such high temperatures.

The emulsion of the invention can be prepared by polymerizing a vinyl ester monomer through emulsion polymerization in the presence of (1) a modified PVA containing from 1 to 15 mol % of ethylene units in the molecule and having a degree of hydrolysis of at least 95 mol %, which serves as a dispersant, and (2) at least one polymerization initiator selected from hydrogen peroxide, ammonium persulfate and potassium persulfate in a molar ratio to the vinyl ester monomer of from 0.001 to 0.01, in such a polymerization mode that (3) from 5 to 20% by weight of all the vinyl ester monomer is fed into the reactor in the initial stage of polymerization and the initiator is fed thereinto all at a time in a molar ratio to the. initial feed of the vinyl ester monomer of from 0.005 to 0.025.

DETAILED DESCRIPTION OF THE PREFERRED EMBODIMENTS

The modified PVA containing from 1 to 15 mol % of ethylene units in the molecule and having a degree of hydrolysis of at least 95 mol %, which serves as the dispersant in the aqueous emulsion of the invention, is obtained by hydrolyzing a copolymer of vinyl ester and ethylene.

The vinyl ester includes, for example, vinyl formate, vinyl acetate, vinyl propionate, vinyl pivalate, etc. From its economical advantage, preferred is vinyl acetate.

Of the modified PVA, the ethylene unit content must fall between 1 and 15 mol %, but preferably between 3 and 13 mol %, more preferably between 5 and 12 mol %. In case where PVA having an ethylene unit content of smaller than 1 mol % is used, it is impossible to obtain an aqueous emulsion having good water resistance (to be indicated by the degree of emulsion release and the degree of water absorption) and good high-temperature viscosity stability, and, in addition, the low-temperature storage stability of the aqueous emulsion containing such PVA is poor, as so demonstrated in Comparative Example 1 to be mentioned hereinunder. On the other hand, PVA having an ethylene unit content of larger than 15 mol % is poorly soluble in water. Therefore, if such PVA is used, it will be impossible to obtain a stable aqueous emulsion.

Not interfering with the object of the invention, the dispersant may be copolymerized with ethylenic unsaturated comonomers. The ethylenic unsaturated comonomers include, for example, acrylic acid, methacrylic acid, fumaric acid, maleic acid (anhydride), itaconic acid, acrylonitrile, methacrylonitrile, acrylamide, methacrylamide, trimethyl(3-acrylamido-3-dimethylpropyl)ammonium chloride, acrylamido-2-methylpropanesulfonic acid and its sodium salt, ethyl vinyl ether, butyl vinyl ether, N-vinylpyrrolidone, vinyl chloride, vinyl bromide, vinyl fluoride, vinylidene chloride, vinylidene fluoride, tetrafluoroethylene, sodium vinylsulfonate, sodium allylsulfonate, etc.

As the case may be, also usable herein is a mercapto-terminated or carboxyl-terminated modified PVA which is obtained by copolymerizing a vinyl ester monomer such as vinyl acetate or the like with ethylene in the presence of a thiol compound such as thiolacetic acid, mercaptopropionic acid or the like, followed by hydrolyzing the resulting copolymer.

The degree of hydrolysis of the ethylene-modified PVA, which is used as the dispersant in the aqueous emulsion of the invention, must be at least 95 mol %, but preferably at least 96 mol %, more preferably at least 97 mol %. In case where PVA having a degree of hydrolysis of smaller than 95 mol % is used, it is impossible to obtain an aqueous emulsion having good water resistance. Preferably, the degree of polymerization the viscosity average polymerization degree) of the modified PVA for use herein falls between 100 and 3000, more preferably between 300 and 3000. PVA having a degree of polymerization of smaller than 100 will fail to exhibit the characteristic of protective colloid; but PVA having a degree of polymerization of larger than 3000 is problematic in its industrial-scale production.

The vinyl ester monomer to form the dispersoid in the aqueous emulsion of the invention includes, for example, vinyl formate, vinyl acetate, vinyl propionate, vinyl pivalate, etc. Vinyl acetate is preferred, as being economical.

In the invention, the monomer to form the dispersoid is mainly a vinyl ester monomer such as that mentioned above. However, combining such a vinyl ester monomer and ethylene is also preferred in the invention. Polymerizing the monomer(s) in a mode of emulsion polymerization gives an aqueous emulsion containing, as the dispersoid, a vinyl ester polymer or a vinyl ester-ethylene copolymer.

Not interfering with the object of the invention, the vinyl ester monomer may be copolymerized with any of ethylenic unsaturated monomers and dienic monomers. The comonomers include, for example, olefins such as propylene, isobutylene, etc.; halogeno-olefins such as vinyl chloride, vinyl fluoride, vinylidene chloride, vinylidene fluoride, etc.; acrylic acid and its esters such as acrylic acid, methyl acrylate, ethyl acrylate, butyl acrylate, 2-ethylhexyl acrylate, dodecyl acrylate, 2-hydroxyethyl acrylate, etc.; methacrylic acid and its derivatives such as methacrylic acid, methyl methacrylate, ethyl methacrylate, butyl methacrylate, 2-ethylhexyl methacrylate, dodecyl methacrylate, 2-hydroxyethyl methacrylate, etc.; dimethylaminoethyl acrylate, dimethylaminoethyl methacrylate and their quaternary derivatives; as well as acrylamide monomers such as acrylamide, methacrylamide, N-methylolacrylamide, N,N-dimethylacrylamide, acrylamido-2-methylpropanesulfonic acid and its sodium salt, etc.; styrene monomers such as styrene, α-styrene, p-styrenesulfonic acid and its sodium or potassium salts; and other monomers such as N-vinylpyrrolidone, etc.; and dienic monomers such as butadiene, isoprene, chloroprene, etc.

The aqueous emulsion of the invention can be typically obtained by the following method. That is, as mentioned hereinabove, the aqueous emulsion of the invention can be obtained by polymerizing a vinyl ester monomer through emulsion polymerization in the presence of (1) a modified PVA containing from 1 to 15 mol % of ethylene units in the molecule and having a degree of hydrolysis of at least 95 mol %, which serves as a dispersant, and (2) at least one polymerization initiator selected from hydrogen peroxide, ammonium persulfate and potassium persulfate in a molar ratio to the vinyl ester monomer of from 0.001 to 0.01, in such a polymerization mode that (3) from 5 to 20% by weight of all the vinyl ester monomer is fed into the reactor in the initial stage of polymerization and the initiator is fed thereinto all at a time in a molar ratio to the initial feed of the vinyl ester monomer of from 0.005 to 0.025.

In producing the aqueous emulsion of the invention, it is important to use at least one polymerization initiator selected from hydrogen peroxide, ammonium persulfate and potassium persulfate. Of these, especially preferred is hydrogen peroxide. In the step of emulsion polymerization in the invention, it is also extremely important to define the molar ratio of the polymerization initiator to the vinyl ester monomer to fall between 0.001 and 0.01, more preferably between 0.002 and 0.007, even more preferably between 0.0025 and 0.005. Though its reason is not clear, using the defined amount of the initiator gives an aqueous emulsion having more improved water resistance, more improved high-temperature viscosity stability and more improved low-temperature storage stability. In case where the molar ratio of the polymerization initiator is smaller than 0.001 as in Example 1 in Japanese Patent Laid-Open No. 81666/1996, it is impossible to obtain the aqueous emulsion of the invention. This is obvious from Comparative Example 5 given hereinunder. On the other hand, in case where the molar ratio of he polymerization initiator is larger than 0.01, it is also impossible to obtain the aqueous emulsion of the invention having good water resistance and good high-temperature viscosity stability. This is obvious from Comparative Example 3 given hereinunder.

As the case may be, the polymerization initiator will be combined with a reducing agent to give a redox system reagent for use in the invention. In that case, in general, hydrogen peroxide will be combined with tartaric acid, L-ascorbic acid, Rongalit or the like; and ammonium or potassium persulfate will be combined with sodium hydrogensulfite, sodium hydrogencarbonate or the like. The amount of the reducing agent is not specifically defined, but may generally fall between 0.05 and 3 equivalents, preferably between 0.1 and 2 equivalents, more preferably between 0.3 and 1.5 equivalents to the polymerization initiator to be combined therewith.

Regarding the mode of adding the polymerization initiator to the reaction system, employed herein is a method of adding it thereto all at a time in the initial stage of polymerization, or that is, adding it in one shot thereto. Concretely, from 5 to 20% by weight of all the vinyl ester monomer to be polymerized is first fed into a reactor in the initial stage of polymerization, and the initiator is fed thereinto all at a time in a molar ratio to the initial feed of the vinyl ester monomer of from 0.005 to 0.025, preferably from 0.008 to 0.020, more preferably from 0.01 to 0.018.

In case where the initial feed ratio of the polymerization initiator is smaller than 0.005, for example, as in Example 1 in Japanese Patent Laid-Open No. 81666/1996, the aqueous emulsion of the invention could not be obtained. This is obvious from Comparative Example 5 mentioned hereinunder.

On the other hand, in case where the initial feed ratio of the polymerization initiator is larger than 0.025, for example, as in Example 1 in Japanese Patent Laid-Open No. 80709/1994, it is also impossible to obtain the aqueous emulsion of the invention having good water resistance and good high-temperature viscosity stability. This is obvious from Comparative Example 6 mentioned hereinunder.

One shot addition of the predetermined amount of the polymerization initiator to the reaction system in the initial stage of polymerization ensures the intended effects as above, enabling stable polymerization of monomers, and the filtration residue from the polymerized emulsion is thereby reduced.

For initial polymerization, the monomer and the polymerization catalyst are added to an aqueous solution of the dispersant, and polymerized at a temperature falling between 50 and 70° C., preferably between 55 and 65° C., for a period of time falling between 15 and 60 minutes, preferably between 20 and 50 minutes. In the initial stage of polymerization, the monomer is preferably fed into the reactor all at a time.

The amount of the dispersant, ethylene-modified PVA to be added to the reaction system is not specifically defined, but preferably falls between 3 and 20 parts by weight, more preferably between 5 and 15 parts by weight, relative to 100 parts by weight of the monomer. If the amount of the dispersant is smaller than 3 parts by weight or larger than 20 parts by weight, the polymerization stability will be low, and the storage stability of the aqueous emulsion produced will be low.

The initial polymerization shall be terminated when the concentration of the remaining vinyl ester monomer (in terms of % by weight of the polymer produced) has reached at most 10%, preferably at most 5%, more preferably at most 1%. The initial polymerization is followed by final polymerization. Also in the stage of final polymerization, the polymerization catalyst is preferably added to the reaction system all at a time (in a mode of one shot addition), but, as the case may be, it may be added thereto in a continuous or intermittent addition mode. In the final polymerization stage, the monomer is preferably added to the system in a continuous addition mode, but, as the case may be, it may be added thereto all at a time. The polymerization temperature in the final polymerization stage is preferably higher by from 5 to 30° C. than that in the initial polymerization stage. Concretely, it may fall between 55 and 100° C., preferably between 60 and 95° C., more preferably between 70 and 90° C.

The polymerization pressure may be normal pressure both for initial polymerization and final polymerization, but, as the case may be, increased pressure will be needed. In particular, in case where copolymers of a vinyl ester with any other comonomer, for example, with ethylene are produced, the monomers must be polymerized under increased pressure.

It is surprising that, in the method of producing an aqueous emulsion as above, which specifically comprises polymerizing a vinyl ester monomer through emulsion polymerization in the presence of a dispersant of a modified PVA containing from 1 to 15 mol % of ethylene units and having a degree of hydrolysis of at least 95 mol % and in the presence of a polymerization initiator in a molar ratio to the vinyl ester monomer of from 0.001 to 0.01, in such a polymerization mode that from 5 to 20% by weight of all the vinyl ester monomer is fed into the reactor in the initial stage of polymerization and the polymerization initiator is fed thereinto all at a time (in one shot) in a molar ratio to the initial feed of the vinyl ester monomer of from 0.005 to 0.025, the polymerization stability is good, and that, according to the method, the aqueous emulsion obtained has the advantages of far improved water resistance and far improved high-temperature viscosity stability (that is, the emulsion is anywhere stable independently of ambient temperatures, and its high-temperature storage stability is good) and has the additional advantage of far improved low-temperature storage stability. This is unexpected at all from the related inventions disclosed in Japanese Patent Laid-Open Nos. 81666/1996, 80709/1994 and 226774/1998. In particular, it is surprising that such excellent aqueous emulsions are obtained in the method of the invention where the amount of the polymerization initiator to be used is specifically defined and the polymerization initiator is added to the system all at a time in the initial stage of polymerization while its amount is specifically defined, and the industrial meaning of the invention is significant to that effect.

The aqueous emulsion of the invention obtained in the manner as above is characterized by its improved water resistance, and is therefore favorable to various applications that require water resistance. In addition, the aqueous emulsion of the invention depends little on ambient temperatures. At elevated temperatures of around 60° C., in general, the viscosity of ordinary vinyl ester polymer emulsions containing an ethylene-modified PVA as a dispersion stabilizer increases greatly. As opposed to these, the viscosity of the aqueous emulsion of the invention does not increase so much even at such elevated temperatures. Therefore, the aqueous emulsion of the invention is free from viscosity increase in its production through emulsion polymerization. In addition, while being stored and transported at high temperatures of around 60° C. or so, the aqueous emulsion of the invention is protected from viscosity increase, and its workability and handlability is therefore extremely good.

The aqueous emulsion of the invention preferably contains a glycol ether compound. More preferably, a glycol ether compound is added to the system of emulsion polymerization to form the aqueous emulsion. Containing a glycol ether compound, the viscosity ratio $T_{60°\,C.}/T_{20°\,C.}$ or $H_{60°\,C.}/H_{20°\,C.}$ of the emulsion can be reduced more. In addition, even when its concentration is higher than usually, the emulsion containing a glycol ether compound can be stable and fine.

The glycol ether compound includes, for example, ethylene glycol monomethyl ether, ethylene glycol dimethyl ether, ethylene glycol monoethyl ether, ethylene glycol diethyl ether, ethylene glycol monopropyl ether, ethylene glycol dipropyl ether, ethylene glycol monobutyl ether, ethylene glycol dibutyl ether, propylene glycol monomethyl ether, propylene glycol dimethyl ether, propylene glycol monoethyl ether, propylene glycol diethyl ether, propylene glycol monopropyl ether, propylene glycol dipropyl ether, propylene glycol monobutyl ether, propylene glycol dibutyl ether; and also ethylene glycol condensates such as diethylene glycol monomethyl ether, diethylene glycol dimethyl ether, diethylene glycol monoethyl ether, diethylene glycol diethyl ether, diethylene g glycol monobutyl ether, diethylene glycol dihexyl ether, triethylene glycol monomethyl ether, tetraethylene glycol dimethyl ether, pentaethylene glycol diethyl ether, hexaethylene glycol dipropyl ether; as well as dipropylene glycol monomethyl ether, dipropylene glycol dimethyl ether, tripropylene glycol dimethyl ether, tetrapropylene glycol dimethyl ether, hexapropylene glycol dimethyl ether, diethylene glycol, triethylene glycol, tetraethylene glycol, dipropylene glycol, 3-methoxy-1-butanol, 3-methoxy-3-methyl-1-butanol, etc. Of these, preferred are hydroxyl group-having glycol ether compounds; and especially preferred is 3-methoxy-3-methyl-1-butanol, which is available on the market, for example, as Kuraray's MMB. Further the glycol ether compound includes glycol ether having a phenyl group, for example, ethylene glycol monophenyl ether, ethylene glycol diphenyl ether, propylene glycol monophenyl ether, polyethylene glycol monophenyl ether. One or more of the compounds may be used either singly or as combined.

The amount of the glycol ether compound to be added to the emulsion is not specifically defined, but may fall generally between 0.5 and 20 parts by weight, preferably between 1 and 10 parts by weight, relative to 100 parts by weight of the solid content of the vinyl ester resin emulsion. If the amount of the compound added is smaller than 0.5 parts by weight, the size of the solid particles constituting the emulsion could not be reduced to a desired degree, and the transparency of the films of the emulsion could not be increased so much. On the other hand, if too much glycol ether compound over 20 parts by weight is added to the polymerization system to give the emulsion, the polymerization stability will be lowered.

The aqueous emulsion of the invention produced according to the method as above may be directly used as it is, but, if desired, it may be combined with any other known emulsions not interfering with the object and the effect of the invention.

The dispersant to be in the aqueous emulsion of the invention is the above-mentioned, ethylene-modified PVA having a degree of hydrolysis of at least 95 mol %. If desired, however, it may be combined with any known anionic, nonionic or cationic surfactants, other PVA, hydroxyethyl cellulose, etc.

As having the excellent characteristics mentioned above, the aqueous emulsion of the invention is favorably used in various fields of paper-processing adhesives for paper or pulp products such as paper tubes, paper bags, paper laminates, corrugated cardboard, etc.; wood-processing adhesives for flush panels, wood laminates, butt-welded wood plates, plywood products, secondary worked plywood products (for jointing them), other ordinary wood products, etc.; adhesives for plastics; binders for dip-coated paper, non-woven fabrics, etc.; as well as admixtures, jointing agents, coating compositions, paper processing agents, fiber processing agents, etc.

EXAMPLES

The invention is described in more detail with reference to the following Examples and Comparative Examples. Unless otherwise specifically indicated, "parts" and "%" in the following Examples and Comparative Examples are all by weight. The emulsions prepared were tested for water resistance and storage stability, according to the methods mentioned below.

Emulsion Evaluation (1) Water Resistance of Film:

The emulsion to be tested is cast on PET and dried thereon at 20° C. and 65% RH for 7 days to form a dry film having a thickness of 500 μm. Discs having a diameter of 2.5 cm are blanked out of the film-coated PET, and immersed in water at 20° C. for 24 hours. The degree of water absorption of the film and the degree of water solubility of the film are obtained as follows:

Water Solubility (%)={1−(absolute dry weight of the immersed film/absolute dry weight of the non-immersed film)}×100;

Water Absorption (%)={(weight of the immersed film/absolute dry weight of the non-immersed film)−1}×100;

wherein, the absolute dry weight of the non-immersed film is represented by [weight of the non-immersed film (containing water)−(weight of the non-immersed film (containing water)×water content of the film (%)/100];

the water content of the film is obtained prior to the test, by drying another sample of the film (this is different from the sample of the film immersed in 20° C. water in the test) at 105° C. for 4 hours to be in an absolute dry condition;

the absolute dry weight of the immersed film is obtained by drying the immersed film at 105° C. for 4 hours to be in an absolute dry condition;

the weight of the immersed film is obtained by applying gauze to the immersed film, immediately after the immersed film has been drawn out of water, to remove therefrom the water having adhered to the immersed film, followed by weighing the thus-wiped film.

(2) Viscosity Stability:

The low-temperature storage stability of the emulsion is indicated by the viscosity change in the emulsion measured after left at 5° C. for 90 days; the temperature dependence thereof is indicated by $T_{60° C.}/T_{20° C.}$ (measured at 60° C. and at 20° C.); and the high-temperature storage stability thereof is indicated by $H_{60° C.}/H_{20° C.}$ (for this, the viscosity of the emulsion is measured after left for 1 week at 60° C. and at 20° C.). The viscosity of the emulsion is measured with a B-type viscometer (at 20 rpm).

(3) Polymerization Stability:

After having been prepared through polymerization, the emulsion is filtered through a 60-mesh metal gauze filter, and the filtration residue (%, relative to the emulsion) is measured. A smaller value of the filtration residue thus obtained indicates better polymerization stability in producing the emulsion.

Example 1

300 g of ion-exchanged water and 26 g of PVA-1 (having a degree of polymerization of 1000, a degree of hydrolysis of 99.9 mol %, and a degree of ethylene modification of 7.0 mol %) were put into a one-liter polymerization reactor of glass equipped with a reflux condenser, a dropping funnel, a thermometer and a nitrogen inlet port, and completely dissolved at 95° C. Next, the resulting aqueous PVA solution was cooled, purged with nitrogen, and then heated up to 60° C. with stirring at 200 rpm. Next, 4.4 g of an aqueous 10% solution of tartaric acid and 3 g of aqueous 5% hydrogen peroxide (its molar ratio to vinyl acetate is 0.015) were added thereto in one shot, and then 26 g of vinyl acetate was added thereto to start its polymerization. 30 minutes after its start, the initial-stage polymerization was finished (in this stage, the amount of the remaining monomer, vinyl acetate was 1% by weight). Next, 0.9 g of an aqueous 10% solution of tartaric acid and 3 g of aqueous 5% hydrogen peroxide were added to the system also in one shot, and then 234 g of vinyl acetate was continuously added thereto over a period of 2 hours to complete its polymerization. The polymerization temperature was kept at 80° C. After cooled, this was filtered through a 60-mesh stainless steel gauze filter. The less the filtration residue is, the better the polymerization stability is.

Through the process, obtained was a polyvinyl acetate emulsion (Em-1) having a solid content of 47.3%. This was evaluated according to the methods mentioned above. Its data are given in Table 1.

Example 2

300 g of ion-exchanged water and 26 g of PVA-1 were put into a one-liter polymerization reactor of glass equipped with a reflux condenser, a dropping funnel, a thermometer and a nitrogen inlet port, and completely dissolved at 95° C. Next, the resulting aqueous PVA solution was cooled, purged with nitrogen, and then heated up to 60° C. with stirring at 200 rpm. Next, 4.4 g of an aqueous 10% solution of tartaric acid and 3 g of aqueous 5% hydrogen peroxide were added thereto in one shot, and then 26 g of vinyl acetate was added thereto to start its polymerization. 30 minutes after its start, the initial-stage polymerization was finished (in this stage, the amount of the remaining monomer, vinyl acetate was 1% by weight). Next, 0.9 g of an aqueous 10% solution of tartaric acid was added to the system, and 15 g of aqueous 1% hydrogen peroxide and 234 g of vinyl acetate were continuously added thereto over a period of 2 hours to complete the polymerization of the monomer. The polymerization temperature was kept at 80° C. After cooled, this was filtered through a 60-mesh stainless steel gauze filter. Based on the filtration residue, the polymerization stability in the process was evaluated in the same manner as in Example 1. Through the process, obtained was a polyvinyl acetate emulsion (Em-2) having a solid content of 47.2%. This was evaluated according to the methods mentioned above. Its data are given in Table 1.

Example 3

300 g of ion-exchanged water and 26 g of PVA-1 were put into a one-liter polymerization reactor of glass equipped with a reflux condenser, a dropping funnel, a thermometer and a nitrogen inlet port, and completely dissolved at 95° C. Next, the resulting aqueous PVA solution was cooled, purged with nitrogen, and then heated up to 60° C. with stirring at 200 rpm. Next, 18 g of an aqueous 10% solution of tartaric acid and 26 g of vinyl acetate were added thereto, and then 85 g of aqueous 1% hydrogen peroxide was continuously added thereto over a period of 2.5 hours to start the polymerization of the monomer. 30 minutes after its start, the initial-stage polymerization was finished (in this stage, the amount of the remaining monomer, vinyl acetate was 1% by weight). Next, 234 g of vinyl acetate was continuously added to the system over a period of 2 hours. After the addition of vinyl acetate thereto, 4.8 g of aqueous 1% hydrogen peroxide was added to the system in one shot to complete the polymerization of the monomer. The polymerization temperature was kept at 80° C. After cooled, this was filtered through a 60-mesh stainless steel gauze filter. Based on the filtration residue, the polymerization stability in the process was evaluated in the same manner as in Example 1. Through the process, obtained was a polyvinyl acetate emulsion (Em-3) having a solid content of 47.6%. This was evaluated according to the methods mentioned above. Its data are given in Table 1.

Example 4

A polyvinyl acetate emulsion (Em-4) having a solid content of 47.5% was prepared in the same manner as in Example 1, for which, however, used was PVA-2 (having a degree of polymerization of 1700, a degree of hydrolysis of 98.0 mol % and a degree of ethylene modification of 5.0 mol %) and not PVA-1. This was evaluated according to the methods mentioned above. Its data are given in Table 1.

Comparative Example 1

A polyvinyl acetate emulsion (comparative Em-1) having a solid content of 47.5% was prepared in the same manner as in Example 1, for which, however, used was PVA-3 (having a degree of polymerization of 1700 and a degree of hydrolysis of 98.5 mol %; Kuraray's PVA-117) and not PVA-1. This was evaluated according to the methods mentioned above. Its data are given in Table 1.

Example 5

300 g of ion-exchanged water and 26 g of PVA-1 were put into a one-liter polymerization reactor of glass equipped with a reflux condenser, a dropping funnel, a thermometer and a nitrogen inlet port, and completely dissolved at 95° C. Next, the resulting aqueous PVA solution was cooled, purged with nitrogen, and then heated up to 60° C. with stirring at 200 rpm. Next, 20 g of an aqueous 10% solution of sodium hydrogensulfite and 26 g of vinyl acetate were added thereto, and then 23.5 g of 4% ammonium persulfate was thereto in one shot to start the polymerization of the monomer. 30 minutes after its start, the initial-stage polymerization was finished (in this stage, the amount of the remaining monomer, vinyl acetate was 1% by weight). Next, 234 g of vinyl acetate was continuously added to the system over a period of 2 hours to complete its polymerization. The polymerization temperature was kept at 80° C. After cooled, this was filtered through a 60-mesh stainless steel gauze filter. Based on the filtration residue, the polymerization stability in the process was evaluated in the same manner as in Example 1. Through the process, obtained was a polyvinyl acetate emulsion (Em-5) having a solid content of 47.3%. This was evaluated according to the methods mentioned above. Its data are given in Table 1.

Example 6

300 g of ion-exchanged water and 26 g of PVA-1 were put into a one-liter polymerization reactor of glass equipped with a reflux condenser, a dropping funnel, a thermometer and a nitrogen inlet port, and completely dissolved at 95° C. Next, the resulting aqueous PVA solution was cooled, purged with nitrogen, and then heated up to 60° C. with stirring at 200 rpm. Next, 20 g of an aqueous 10% solution of sodium hydrogensulfite and 26 g of vinyl acetate were added thereto, and then 27.9 g of 1% potassium persulfate was thereto in one shot to start the polymerization of the monomer. 30 minutes after its start, the initial-stage polymerization was finished (in this stage, the amount of the remaining monomer, vinyl acetate was 1% by weight). Next, 234 g of vinyl acetate was continuously added to the system over a period of 2 hours to complete its polymerization. The polymerization temperature was kept at 80° C. After cooled, this was filtered through a 60-mesh stainless steel gauze filter. Based on the filtration residue, the polymerization stability in the process was evaluated in the same manner as in Example 1. Through the process, obtained was a polyvinyl acetate emulsion (Em-6) having a solid content of 47.3%. This was evaluated according to the methods mentioned above. Its data are given in Table 1.

Comparative Example 2

A polyvinyl acetate emulsion (comparative Em-2) having a solid content of 47.5% was prepared in the same manner as in Example 1, for which, however, used was PVA-4 (having a degree of polymerization of 1700 and a degree of hydrolysis of 88.0 mol %; Kuraray's PVA-217) and not PVA-1.

Comparative Example 3

300 g. of ion-exchanged water and 26 g of PVA-1 were put into a one-liter polymerization reactor of glass equipped with a reflux condenser, a dropping funnel, a thermometer and a nitrogen inlet port, and completely dissolved at 95° C. Next, the resulting aqueous PVA solution was cooled, purged with nitrogen, and then heated up to 60° C. with stirring at 200 rpm. Next, 12 g of an aqueous 10% solution of tartaric acid and 30 g of aqueous 5% hydrogen peroxide were added thereto in one shot, and then 26 g of vinyl acetate were thereto to start its polymerization. 30 minutes after its start, the initial-stage polymerization was finished (in this stage, the amount of the remaining monomer, vinyl acetate was 1% by weight). Next, 0.9 g of an aqueous 10% solution of tartaric acid and 30 g of aqueous 5% hydrogen peroxide were added to the system in one shot, and then 234 g of vinyl acetate were continuously added thereto over a period of 2 hours to complete its polymerization. The polymerization temperature was kept at 80° C. After cooled, this was filtered through a 60-mesh stainless steel gauze filter. Based on the filtration residue, the polymerization stability in the process was evaluated in the same manner as in Example 1. Through the process, obtained -was a polyvinyl acetate emulsion (comparative Em-3) having a solid content of 47.5%. This was evaluated according to the methods mentioned above. Its data are given in Table 1.

Comparative Example 4

300 g of ion-exchanged water and 26 g of PVA-1 were put into a one-liter polymerization reactor of glass equipped with a reflux condenser, a dropping funnel, a thermometer and a nitrogen inlet port, and completely dissolved at 95° C. Next, the resulting aqueous PVA solution was cooled, purged with nitrogen, and then heated up to 60° C. with stirring. at 200 rpm. Next, 0.15 g of an aqueous 10% solution of tartaric acid and 0.1 g of aqueous 5% hydrogen peroxide were added thereto in one shot, and then 26 g of vinyl acetate was thereto to start its polymerization. 30 minutes after its start, the initial-stage polymerization was finished (in this stage, the amount of the remaining monomer, vinyl acetate was 1% by weight). Next, 0.1 g of an aqueous 10% solution of tartaric acid and 0.1 g of aqueous 5% hydrogen peroxide were added to the system in one shot, and then 234 g of vinyl acetate was continuously added thereto over a period of 2 hours to complete its polymerization. The polymerization temperature was kept at 80° C. In the process, however, the system was coagulated, and an aqueous emulsion could not be obtained.

Example 7

100 parts of an aqueous 7.5% solution of PVA-1 was put into a pressure autoclave equipped with a nitrogen inlet port, a thermometer and a stirrer. After heated up to 60° C., this was purged with nitrogen. Next, 8 parts of vinyl acetate was added to the system, then ethylene was introduced thereinto to have an increased pressure of 45 kg/cm$^2$, and 0.3 parts of aqueous 2.5% hydrogen peroxide and 0.45 parts of an aqueous 2% solution of Rongalit were added thereto under pressure to start the polymerization of the monomer. 30 minutes after its start, the initial-stage polymerization was finished (in this stage, the amount of the remaining monomer, vinyl acetate was 1% by weight). Next, this was heated up to 80° C., and 72 parts of vinyl acetate, 1.5 parts of aqueous 1% hydrogen peroxide and 0.45 parts of an aqueous 2% solution of Rongalit were added thereto under pressure over a period of 2 hours to complete the polymerization of the monomer. The polymerization temperature was kept at 80° C. After cooled, this was filtered in the same manner as in Example 1. Through the process, obtained was an ethylene-vinyl acetate copolymer emulsion (Em-7) having a solid content of 50.2% and an ethylene content of 16% by weight. This was evaluated according to the methods mentioned above. Its data are given in Table 1.

Comparative Example 5 (Japanese Patent Laid-Open No. 81666/1996):

1400 g of ion-exchanged water and 225 g of ethylene-modified PVA (having a degree of polymerization of 1400, a degree of hydrolysis of 98.0 mol % and an ethylene content of 5.5 mol %) were put into a 5-liter polymerization reactor of glass equipped with a ref lux condenser, a dropping funnel, a thermometer and a nitrogen inlet port, and completely dissolved at 95° C. Next, the aqueous modified PVA solution was cooled, and controlled to have a pH of 4. 0.05 g of ferrous chloride was added to this, which was then purged with nitrogen. Next, 350 g of vinyl acetate was added to this with stirring at 140 rpm, and then heated up to 60° C. With continuously introducing aqueous 0.7% hydrogen peroxide thereinto at a rate of 15 ml/hr and an aqueous 6% solution of Rongalit at a rate of 10 ml/hr, the monomer was polymerized at 70° C. 30 minutes after its start, the initial-stage polymerization was finished (in this stage, the amount of the remaining monomer, vinyl acetate was 1% by weight). Next, 1400 g of vinyl acetate was continuously added to the system over a period of 3 hours. After the addition, the system was kept at 80° C. for 1 hour to complete the polymerization of the monomer. Through the process, obtained was an aqueous polyvinyl acetate emulsion (comparative Em-5) having a solid content of 50.4%. This was evaluated, and its data are given in Table 1.

Comparative Example 6 (Japanese Patent Laid-Open No. 80709/1994):

20 g of PVA (having a degree of polymerization of 1200, a degree of hydrolysis of 90.0 mol % and an ethylene content of 7.2 mol %) was dissolved in 240 g of water in a one-liter polymerization reactor of glass equipped with a stirrer, a reflux condenser, a thermometer and a dropping funnel. Next, 20 g of vinyl acetate was added thereto. After the temperature inside the reactor reached 70° C., 0.3 g of hydrogen peroxide and 0.5 g of tartaric acid were added to the system to start the polymerization of the monomer. 30 minutes after its start, the initial-stage polymerization was finished (in this stage, the amount of the remaining monomer, vinyl acetate was 1% by weight). Next, 180 g of vinyl acetate and 0.3 g of hydrogen peroxide were continuously added to the system over a period of 3 hours. After the addition, the system was kept at 80° C. for 1 hour to ripen it. Through the process, obtained was an aqueous polyvinyl acetate emulsion (comparative Em-6). This was evaluated, and its data are given in Table 1.

Comparative Example 7 (Japanese Patent Laid-Open No. 226744/1998)

An aqueous polyvinyl acetate emulsion (comparative Em-7) was prepared in the same manner as in Comparative Example 5, for which, however, used was ethylene-modified PVA (having a degree of polymerization of 1000, a degree of hydrolysis of 99.7 mol % and an ethylene content of 7.5 mol %) and not ethylene-modified PVA (having a degree of polymerization of 1400, a degree of hydrolysis of 98.0 mol % and an ethylene content of 5.5 mol %). This was evaluated, and its data are given in Table 1.

The amount of PVA and that of the polymerization initiator used in Examples and Comparative Examples mentioned above, and the initial feed ratio of the monomer (% by weight to the overall amount of the monomer, vinyl acetate) therein are summarized in Table 2.

TABLE 1

| | Properties of Emulsion | | | | | |
|---|---|---|---|---|---|---|
| | Polymerization Stability | Water resistance of Film | | Viscosity Stability | | |
| | | | | Low- | High-temperature Viscosity Stability | |
| | Filtration Residue wt. % | Water Solubility (%) | Water Absorption (%) | temperature Storage Stability | Temperature Dependence $T_{60°C}/T_{20°C}$ | High-temperature Storage Stability $H_{60°C}/H_{20°C}$ |
| Example 1 | 0.007 | 0.4 | 18.6 | no change | 1.1 | 1.3 |
| Example 2 | 0.005 | 0.5 | 19.0 | no change | 1.2 | 1.5 |
| Example 3 | 0.008 | 0.5 | 20.5 | no change | 1.3 | 1.6 |
| Example 4 | 0.006 | 1.1 | 26.3 | no change | 1.1 | 1.3 |
| Example 5 | 0.009 | 0.8 | 21.3 | no change | 1.1 | 1.2 |
| Example 6 | 0.009 | 0.9 | 22.3 | no change | 1.1 | 1.1 |
| Example 7 | 0.004 | 1.3 | 22.2 | no change | 1.7 | 2.1 |
| Example 22 | 0.003 | 0.6 | 19.8 | no change | 0.8 | 1.0 |
| Comp. Ex. 1 | 0.03 | 1.6 | 29.0 | gelled | 0.8 | 0.8 |
| Comp. Ex. 2 | 0.005 | 5.6 | 54.3 | no change | 1.0 | 1.0 |
| Comp. Ex. 3 | 0.01 | 3.4 | 45.3 | no change | 6.6 | 10.2 |
| Comp. Ex. 4 | As coagulated, an aqueous emulsion could not be obtained. | | | | | |
| Comp. Ex. 5 | 0.07 | 3.4 | 40.5 | no change | 2.4 | 2.8 |
| Comp. Ex. 6 | 0.007 | 2.0 | 33.1 | no change | 2.7 | 5.6 |
| Comp. Ex. 7 | 0.010 | 2.5 | 30.3 | gelled | 2.1 | 2.5 |

| | Dispersant PVA | | | | Polymerization Initiator | | |
|---|---|---|---|---|---|---|---|
| | Degree of Polymerization | Degree of Hydrolysis (mol %) | Degree of Ethylene Modification (mol %) | Amount of Dispersant PVA Used (wt. % to overall vinyl acetate) | | Molar Ratio (to overall monomer) | Initial Molar Ratio (to initial feed of vinyl acetate) | Initial Feed Ratio of Vinyl Acetate (wt. % to overall vinyl acetate) |
| Example 1 | 1000 | 99.0 | 7.0 | 10 | hydrogen peroxide | 0.0028 | 0.015 | 10 |
| Example 2 | 1000 | 99.0 | 7.0 | 10 | hydrogen peroxide | 0.0028 | 0.015 | 10 |
| Example 3 | 1000 | 99.0 | 7.0 | 10 | hydrogen peroxide | 0.0087 | 0.016 | 10 |

-continued

|  | Dispersant PVA | | | Polymerization Initiator | | | |
|---|---|---|---|---|---|---|---|
|  | Degree of Polymerization | Degree of Hydrolysis (mol %) | Degree of Ethylene Modification (mol %) | Amount of Dispersant PVA Used (wt. % to overall vinyl acetate) |  | Molar Ratio (to overall monomer) | Initial Molar Ratio (to initial feed of vinyl acetate) | Initial Feed Ratio of Vinyl Acetate (wt. % to overall vinyl acetate) |
| Example 4 | 1700 | 98.0 | 5.0 | 10 | hydrogen peroxide | 0.0028 | 0.015 | 10 |
| Example 5 | 1000 | 99.0 | 7.0 | 10 | ammonium persulfate | 0.0013 | 0.013 | 10 |
| Example 6 | 1000 | 99.0 | 7.0 | 10 | potassium persulfate | 0.0028 | 0.0053 | 10 |
| Example 7 | 1000 | 99.0 | 7.0 | 9.4 | hydrogen peroxide | 0.0047 | 0.0024 | 10 |
| Example 22 | 1000 | 99.0 | 7.0 | 10 | hydrogen peroxide | 0.0028 | 0.015 | 10 |
| Comp. Ex. 1 | 1700 | 98.5 | 0 | 10 | hydrogen peroxide | 0.0028 | 0.015 | 10 |
| Comp. Ex. 2 | 1700 | 88.0 | 0 | 10 | hydrogen peroxide | 0.0028 | 0.015 | 10 |
| Comp. Ex. 3 | 1000 | 99.0 | 7.0 | 10 | hydrogen peroxide | 0.028 | 0.15 | 10 |
| Comp. Ex. 4 | 1000 | 99.0 | 7.0 | 10 | hydrogen peroxide | 0.000097 | 0.00049 | 10 |
| Comp. Ex. 5 | 1400 | 98.0 | 5.5 | 12.9 | hydrogen peroxide | 0.0007 | 0.0004 | 10 |
| Comp. Ex. 6 | 1200 | 90.0 | 7.2 | 10 | hydrogen peroxide | 0.0084 | 0.038 | 10 |
| Comp. Ex. 7 | 1000 | 99.7 | 7.5 | 12.9 | hydrogen peroxide | 0.0007 | 0.0004 | 10 |

Examples 8 to 14, and Comparative Examples 8 to 13

Em-1 (Example 8), Em-2 (Example 9), Em-3 (Example 10), Em-4 (Example 11), Em-5 (Example 12), Em-6 (Example 13), Em-7 (Example 14), Comparative Em-1 (Comparative Example 8), Comparative Em-2 (Comparative Example 9), Comparative Em-3 (Comparative Example 10), Comparative Em-5 (Comparative Example 11), Comparative Em-6 (Comparative Example 12), Comparative Em-7 (Comparative Example 13) were separately formulated into adhesives for wood working, and evaluated under the following conditions. The test data obtained are given in Table 3.

(4) Ordinary Bonding Strength (to birch lumber):

The adhesive is applied onto a piece of straight-grained birch lumber in an amount of 150 g/m$^2$, and this is stuck on another piece of the same lumber. The two with the adhesive therebetween are pressed under a pressure of 7 kg/m$^2$ for 16 hours. After released from the pressure, this is cured at 20° C. and 65% RH for 5 days. The ordinary bonding strength of the test sample is measured at 20° C. and 65% RH.

(5) Water resistance Bonding Strength (to birch lumber):

The adhesive is applied onto apiece of straight-grained birch lumber in an amount of 150 g/m$^2$, and this is stuck on another piece of the same lumber. The two with the adhesive therebetween are pressed under a pressure of 7 kg/m$^2$ for 16 hours. After released from the pressure, this is cured at 20° C. and 65% RH for 5 days. Next, this is immersed in warm water at 60° C. for 3 hours. While still wet, the compression shear strength of the test sample is measured.

(6) Water resistance Bonding Strength (to secondary-worked plywood):

The adhesive is applied onto a piece of lauan plywood (plywood of Group 1, five-layered laminate) in an amount of 2000 g/m$^2$, and this is stuck on another piece of the same plywood. The two with the adhesive therebetween are pressed under a pressure of 7 kg/m$^2$ for 3 hours. After released from the pressure, this is cured at 20° C. and 65% RH for 5 days. Next, this is immersed in warm water at 60° C. for 3 hours. While still wet, this is subjected to a bonding strength test.

TABLE 3

|  | Bonding Strength to Birch Lumber, kg/cm$^2$ (strength at break of non-bonded birch lumber in parenthesis) | | Bonding Strength to Plywood (after immersed in water) |
|---|---|---|---|
|  | Ordinary Bonding Strength | Bonding Strength after immersed in warm water |  |
| Example 8 | 240(50) | 45 | not peeled |
| Example 9 | 230(40) | 42 | not peeled |
| Example 10 | 220(40) | 32 | not peeled |
| Example 11 | 200(40) | 30 | not peeled |
| Example 12 | 200(35) | 25 | not peeled |
| Example 13 | 210(35) | 27 | not peeled |
| Example 14 | 210(35) | 28 | not peeled |
| Comp. Example 8 | 190(25) | 10 | peeled a little |
| Comp. Example 9 | 170(20) | 0 | peeled completely |
| Comp. Example 10 | 180(25) | 15 | peeled a little |
| Comp. Example 11 | 190(25) | 17 | peeled a little |
| Comp. Example 12 | 195(30) | 19 | peeled a little |
| Comp. Example 13 | 190(25) | 18 | peeled a little |

Examples 15 to 21, and Comparative Examples 14 to 19

Em-1 (Example 15), Em-2 (Example 16), Em-3 (Example 17), Em-4 (Example 18), Em-5 (Example 19), Em-6 (Example 20), Em-7 (Example 21), Comparative Em-1 (Comparative Example 14), Comparative Em-2 (Comparative Example 15), Comparative Em-3 (Comparative Example 16), Comparative Em-5 (Comparative Example 17), Comparative Em-6 (Comparative Example 18), Comparative Em-7 (Comparative Example 19) were separately formulated into adhesives for paper working, and evaluated under the following conditions. The test data obtained are given in Table 4.

(7) Initial Bonding Strength:

Using a JT's initial bonding strength tester (JT-1), the adhesive is applied to Kraft paper and its initial bonding strength is measured (the pressing time is 10 seconds).

(8) Ring Flush Strength:

Two sheets of paper for paper tubes are bonded with the adhesive, and the bonding strength is measured at 20° C. and 65% RH according to JIS P-8126.

(9) Water resistance Bonding Strength:

The adhesive is applied to a sheet of Kraft paper in an amount of 30 g/m², and is stuck on another sheet of Kraft paper. The two with the adhesive therebetween are rolled three times with a hand roll. After dried, the thus-processed sample is immersed in water at 30° C. for 72 hours. After taken out of water, the condition of the sample is checked. Broken samples are in the rank A; samples broken a little are in the rank B; and peeled samples are in the rank C.

Example 22

A polyvinyl acetate emulsion having a solid content of 55% was prepared in the same manner as in Example 1, for which, however, used was 230 g of ion-exchanged water with 13 g of 3-methoxy-3-methyl-1-butanol (Kuraray's MMB), and not 300 g of ion-exchanged water. This was evaluated according to the methods mentioned above. Its data are given in Tables 1 and 2.

TABLE 4

|  | Initial Bonding Strength (kg/cm²) | Ring Flush Strength (kgf) | Water resistance Bonding Strength |
| --- | --- | --- | --- |
| Example 15 | 10 | 350 | A |
| Example 16 | 11 | 356 | A |
| Example 17 | 9 | 345 | A |
| Example 18 | 10 | 350 | A |
| Example 19 | 7 | 320 | A |
| Example 20 | 10 | 345 | A |
| Example 21 | 11 | 340 | A |
| Comp. Example 14 | 6 | 280 | B |
| Comp. Example 15 | 2 | 200 | C |
| Comp. Example 16 | 5 | 270 | B |
| Comp. Example 17 | 5 | 275 | B |
| Comp. Example 18 | 6 | 280 | B |
| Comp. Example 19 | 4 | 260 | B |

The aqueous emulsion obtained according to the method of the invention has good water resistance and good storage stability, and is favorably used in various fields of adhesives for paper products, wood products, plastics, etc., binders for dip-coated paper, non-woven fabrics, etc., as well as admixtures, jointing agents, coating compositions, paper processing agents, fiber processing agents, etc. In the method for producing the aqueous emulsion of the invention, the polymerization stability is good.

While the invention has been described in detail and with reference to specific embodiments thereof, it will be apparent to one skilled in the art that various changes and modifications can be made therein without departing from the spirit and scope thereof.

What is claimed is:

1. An aqueous emulsion which comprises, as the dispersant, a polyvinyl alcohol containing from 1 to 15 mol % of ethylene units in the molecule and having a degree of hydrolysis of at least 95 mol %, and, as the dispersoid, a vinyl ester polymer, and which is characterized in that, when its film is immersed in water at 20° C. for 24 hours, the degree of water solubility of the film is not more than 1.5%, and the degree of water absorption of the film is not more than 30%, and that the ratio of the emulsion viscosity at 60° C. ($T_{60°\ C.}$) to the emulsion viscosity at 20° C. ($T_{20°\ C.}$), $T_{60°\ C.}/T_{20°\ C.}$ is not more than 2.

2. The aqueous emulsion as claimed in claim 1, which is further characterized in that the ratio of the emulsion viscosity after storage at 60° C. for 1 week ($H_{60°\ C.}$) to that after storage at 20° C. for 1 week ($H_{20°\ C.}$), $H_{60°\ C.}/H_{20°\ C.}$ is not more than 2.5.

3. A method for producing the aqueous emulsion of claim 1, which comprises polymerizing a vinyl ester monomer through emulsion polymerization in the presence of (1) a polyvinyl alcohol containing from 1 to 15 mol % of ethylene units in the molecule and having a degree of hydrolysis of at least 95 mol %, which serves as a dispersant, and (2) at least one polymerization initiator selected from the group consisting of hydrogen peroxide, ammonium persulfate and potassium persulfate in a molar ratio to the vinyl ester monomer of from 0.001 to 0.01, in such a polymerization mode that (3) from 5 to 20% by weight of all the vinyl ester monomer is fed into the reactor in the initial stage of polymerization and the initiator is fed thereinto all at one time in a molar ratio to the initial feed of the vinyl ester monomer of from 0.005 to 0.025.

4. The aqueous emulsion as claimed in claim 1, which contains a glycol ether compound.

5. The aqueous emulsion as claimed in claim 4, wherein the glycol ether compound is 3-methoxy-3-methyl-1-butanol.

6. The aqueous emulsion as claimed in claim 1, wherein the polyvinyl alcohol has a degree of polymerization of 100 to 3000.

7. An aqueous emulsion, comprising:

as a dispersant, a polyvinyl alcohol containing from 1 to 15 mol % of ethylene units in the molecule and having a degree of hydrolysis of at least 95 mol %;

as a dispersoid, a vinyl ester polymer; and a glycol ether compound;

wherein, when its film is immersed in water at 20° C. for 24 hours, the degree of water solubility of the film is not more than 1.5%, and the degree of water absorption of the film is not more than 30%, and wherein ratio of the emulsion viscosity at 60° C. ($T_{60°\ C.}$) to the emulsion viscosity at 20° C. ($T_{20°\ C.}$), $T_{60°\ C.}/T_{20°\ C.}$ is not more than 2.

8. A method for producing an aqueous emulsion, comprising:

polymerizing a vinyl ester monomer through emulsion polymerization in the presence (1) a polyvinyl alcohol containing from 1 to 15 mol % of ethylene units in the molecule and having a degree of hydrolysis of at least 95 mol %, which serves as a dispersant, and (2) at least one polymerization initiator selected from the group consisting of hydrogen peroxide, ammonium persulfate and potassium persulfate in a molar ratio to the vinyl ester monomer of from 0.001 to 0.01, in such a polymerization mode that (3) from 5 to 20% by weight of all the vinyl ester monomer is fed into the reactor in the initial stage of polymerization and the initiator is fed thereinto all at one time in a molar ratio to the initial feed of the vinyl ester monomer of from 0.005 to 0.025;

wherein said aqueous emulsion comprises:

as the dispersant, a polyvinyl alcohol containing from 1 to 15 mol % of ethylene units in the molecule and having a degree of hydrolysis of at least 95 mol %, and as the dispersoid, a vinyl ester polymer, and wherein, when its film is immersed in water at 20° C. for 24 hours, the degree of water solubility of the film is not more than 1.5%, and the degree of water absorption of the film is not more than 30%, and that the ratio of the emulsion viscosity at 60° C. ($T_{60°C.}$) to the emulsion viscosity at 20° C. ($T_{20°C}$), $T_{60°C.}/T_{20°C.}$ is not more than 2.

9. The aqueous emulsion according to claim 1, produced by a method comprising:

polymerizing a vinyl ester monomer through emulsion polymerization in the presence of
(1) a polyvinyl alcohol containing from 1 to 15 mol % of ethylene units in the molecule and having a degree of hydrolysis of at least 95 mol %, which serves as a dispersant, and
(2) at least one polymerization initiator selected from the group consisting of hydrogen peroxide, ammonium persulfate and potassium persulfate in a molar ratio to the vinyl ester monomer of from 0.001 to 0.01, in such a polymerization mode that (3) from 5 to 20% by weight of all the vinyl ester monomer is fed into the reactor in the initial stage of polymerization and the initiator is fed thereinto all at one time in a molar ratio to the initial feed of the vinyl ester monomer of from 0.005 to 0.025.

10. A film obtained from the aqueous emulsion according to claim 1.

11. The film according to claim 10, having a degree of water solubility of not more than 1.1%.

12. The film according to claim 10, having a degree of water absorption of not more than 27%.

13. The method according to claim 3, wherein said vinyl ester is vinyl acetate.

14. The aqueous emulsion according to claim 1, wherein said dispersant is copolymerized with an ethylenically unsaturated comonomer.

15. The aqueous emulsion according to claim 1, wherein said polyvinylalcohol is mercapto-terminated or carboxyl-terminated.

16. The aqueous emulsion according to claim 1, wherein the degree of polymerization of said polyvinylalcohol is between 100 and 3000.

17. The method according to claim 3, wherein said molar ratio of polymerization initiator to vinyl ester is 0.0025 to 0.005.

18. The method according to claim 3, wherein the polymerization is conducted at a temperature between 50 and 70° C.

19. The method according to claim 4, wherein an amount of said glycol ether compound is 0.5 to 20 parts by weight, relative to 100 parts by weight of a solid content of the emulsion.

* * * * *

UNITED STATES PATENT AND TRADEMARK OFFICE
CERTIFICATE OF CORRECTION

PATENT NO.    : 6,451,898, B1                                              Page 1 of 1
DATED         : September 17, 2002
INVENTOR(S)   : Seiji Tanimoto et al.

It is certified that error appears in the above-identified patent and that said Letters Patent is hereby corrected as shown below:

Column 17,
Line 64, "($T_{60° C}$" should read -- ($T_{60° C}$) --

Signed and Sealed this

Fourth Day of February, 2003

JAMES E. ROGAN
*Director of the United States Patent and Trademark Office*